(12) United States Patent
Koerner et al.

(10) Patent No.: US 12,123,506 B2
(45) Date of Patent: Oct. 22, 2024

(54) VALVE FOR FLOW REGULATION IN A HEATING AND/OR COOLING SYSTEM

(71) Applicant: Berger Holding Gmbh & Co. KG, Memmingen (DE)

(72) Inventors: Martin Koerner, Langenargen (DE); Thomas Moser, Dietmannsried (DE)

(73) Assignee: Berger Holding GmbH & Co. KG, Memmingen (DE)

( * ) Notice: Subject to any disclaimer, the term of this patent is extended or adjusted under 35 U.S.C. 154(b) by 35 days.

(21) Appl. No.: 18/123,043

(22) Filed: Mar. 17, 2023

(65) Prior Publication Data
US 2023/0323964 A1    Oct. 12, 2023

(30) Foreign Application Priority Data
Apr. 7, 2022 (DE) .................... 10 2022 108 365.9

(51) Int. Cl.
*F16K 11/085* (2006.01)
*F16K 31/04* (2006.01)
(Continued)

(52) U.S. Cl.
CPC ........ *F16K 11/0856* (2013.01); *F16K 31/041* (2013.01); *F24F 11/36* (2018.01);
(Continued)

(58) Field of Classification Search
None
See application file for complete search history.

(56) References Cited

U.S. PATENT DOCUMENTS

| 2,129,231 A | * | 9/1938 | Parker ................ F16K 11/0856 |
| | | | 137/625.29 |
| 10,677,674 B2 | * | 6/2020 | Stevens ................ F24H 15/12 |
| | | (Continued) | |

FOREIGN PATENT DOCUMENTS

| CA | 2362991 | 12/2005 |
| CN | 111102379 | 5/2020 |

(Continued)

OTHER PUBLICATIONS

DPMA Office Action in DE Application No. 10 2022 108 365.9 dated Jan. 5, 2023, 13 pages.
(Continued)

*Primary Examiner* — Umashankar Venkatesan
(74) *Attorney, Agent, or Firm* — Andrew M. Calderon; Calderon Safran & Wright P.C.

(57) ABSTRACT

A valve is provided for flow regulation in a heating and/or cooling system. The valve includes a first valve unit with a first valve element and a second valve unit with a second valve element. The first valve unit and the second valve unit each have three valve ports. The first valve element and the second valve element are arranged in a common valve housing and the first and second valve elements fluidically couple, in a first valve element position, a first valve port to a third valve port and, in a second valve element position, couple a second valve port to the third valve port. The first valve element and the second valve element are movable together by an actuating apparatus into the first valve element position or the second valve element position. In addition, a system for heating and/or cooling including the valve is provided.

18 Claims, 7 Drawing Sheets

(51) Int. Cl.
    *F24F 11/36*     (2018.01)
    *F24F 11/84*     (2018.01)
    *F24F 140/20*     (2018.01)
    *F24F 140/50*     (2018.01)

(52) U.S. Cl.
    CPC ........... *F24F 11/84* (2018.01); *F24F 2140/20* (2018.01); *F24F 2140/50* (2018.01)

(56) References Cited

U.S. PATENT DOCUMENTS

| | | | | |
|---|---|---|---|---|
| 10,982,780 | B2* | 4/2021 | Yu | F16K 31/535 |
| 2017/0067656 | A1 | 3/2017 | Guidetti et al. | |
| 2017/0321814 | A1* | 11/2017 | Aoki | F16K 11/0856 |
| 2018/0094733 | A1 | 4/2018 | Clement et al. | |
| 2020/0042021 | A1* | 2/2020 | Somani | G01F 1/363 |
| 2020/0240665 | A1 | 7/2020 | Jenks | |
| 2022/0136712 | A1* | 5/2022 | Ardha | F24D 3/1066 |
| | | | | 237/2 B |
| 2024/0052936 | A1* | 2/2024 | Tiemeyer | F01P 7/165 |

FOREIGN PATENT DOCUMENTS

| | | |
|---|---|---|
| DE | 19955855 | 5/2001 |
| DE | 102009049575 | 4/2011 |
| DE | 102018129454 | 1/2020 |
| DE | 112012003700 | 1/2023 |
| EP | 3141822 | 3/2017 |
| EP | 3143315 | 3/2017 |
| EP | 3690290 | 8/2020 |
| GB | 516614 | 12/1939 |
| JP | 2016-217551 | 12/2016 |
| JP | 2020-46832 | 3/2020 |
| WO | 99/41535 | 8/1999 |
| WO | 2017/187505 | 11/2017 |

OTHER PUBLICATIONS

European Search Report in EP Application No. 23158667.8-1015 dated Aug. 23, 2023, 15 pages.

Japanese Office Action issued in related JP Application No. 2023-060323 dated Apr. 2, 2024, 12 pages.

\* cited by examiner

1a

VALVE FOR FLOW REGULATION IN A HEATING AND/OR COOLING SYSTEM

FIELD OF THE INVENTION

The present invention relates to the field of heating, ventilation and air-conditioning. In particular, the present invention relates to a valve for flow regulation in a heating and/or cooling system. The invention further relates to a heating and/or cooling system which comprises at least one such valve.

BACKGROUND

The heating and/or cooling of buildings, in particular office buildings, is energy-intensive and costs a great deal of money. Through automated monitoring and regulation of the heating and/or cooling systems installed in buildings, the efficiency thereof during heating and/or cooling can be substantially increased. For this purpose, however, the heating and/or cooling systems must be equipped or retrofitted with complex sensing and regulating technology which permits, on the basis of measured climate parameters such as the room temperature, the quantity of heating and/or cooling medium in the building to be regulated. The regulating technology comprises herein not only electronic calculating and control modules which evaluate the sensor signals and, on the basis thereof, generate corresponding control commands, but also valves (hydraulic valves) installed into the heating and/or cooling circuit. These are switched accordingly dependent upon the control commands received in order to regulate and/or set the flow of heat and/or coolant in the heating and/or cooling circuit accordingly. In order to actuate the valves, suitable actuating mechanisms (actuators) must also be provided.

The installation of sensors and regulating technology components into heating and/or cooling systems is complex since the individual components must be wired to one another in order to ensure the communication between the components and the electrical supply to the components. The installation space is often very restricted so that the installation of valves with an actuating mechanism is additionally made more difficult.

From EP 3 143 315 B1, a compact 6-way valve for flow regulation is known, wherein the valve is constructed from two valve units. The first valve unit comprises three valve ports which are fluidically coupled to the supply flow of a cooling circuit, a heating circuit and a consumer. In exactly the same way, the second valve unit comprises three valve ports which are fluidically coupled to the return of a cooling circuit, a heating circuit and a consumer. The two valve units are each designed in the form of ball valves wherein the two spherical valve elements are coupled to one another by way of a separate coupling element. In addition, the two spherical valve elements each have a through passage which consists of two bores arranged perpendicularly to one another. The two through passages enable an optional coupling of the consumer to the heating circuit and the cooling circuit. The valve design taught in EP 3 143 315 B1 is constructed compactly, but due to its spherical valve elements, is however complex in its production.

It is an object of the present invention to provide a valve for a heating and/or cooling circuit which is simple and economical in production and is also provided to couple a consumer (for example, a heating and/or cooling element) optionally to a heating and/or cooling circuit. In addition, the valve is to have a high level of integration of the valve components in order to enable a compact design.

A further object of the present invention lies in providing a valve for a heating and/or cooling system which is designed to be smart/clever and is also able to regulate the flow of cooling and/or heating medium independently or at least partially independently.

A further object of the present invention lies in providing a valve for a heating and/or cooling system which can independently recognise and signal leaks.

A further object of the present invention lies in providing a heating and/or cooling system which can integrated into an existing building management system.

SUMMARY OF THE INVENTION

To achieve at least one of the above-mentioned objects, according to a first aspect, a valve for flow regulation in a heating and/or cooling system is provided, wherein the valve comprises: a first valve unit with a first valve element, and a second valve unit with a second valve element wherein the first valve unit and the second valve unit each have at least three valve ports. The first valve element and the second valve element are arranged in a common valve housing and are designed so that the two valve elements in their respective valve unit fluidically couple, in a first valve element position, a first valve port to a third valve port and, in a second valve element position, a second valve port to the third valve port, wherein the first valve element and the second valve element are movable together by means of an actuating apparatus into the first valve element position or the second valve element position.

Through the joint actuation of both valve elements into the first valve position or the second valve position, it is therefore possible optionally to couple fluidically a consumer (heat consumer/cold consumer) coupled to the third valve port of each valve unit either to a heating circuit coupled to the first valve port of each valve unit or to a cooling circuit coupled to the second valve port of each valve unit. For fluidic coupling of the valve ports, each valve element can have at least one through channel.

The two valve elements can be designed and also arranged movably in the common valve housing such that, in a third valve position, they fluidically (completely) decouple the third valve port of the respective valve unit from the first valve port and from the second valve port of the respective valve unit. In this valve position, the valve is in an (absolute) shut-off position so that no heating or cooling medium can flow through the valve. The third valve position can be realised as a separate valve position. According to one variant, the third valve position can be arranged between the first valve position and the second valve position.

The two valve elements can be part of a common valve element, preferably integrally designed. This can be accommodated to be able to rotate about its rotation axis in the common valve housing. In particular, the common valve element can be designed cylindrical (that is, configured as a unified cylindrical body). The integral configuration of the two valve elements enables a particularly compact construction of the valve. Furthermore, the number of valve components is reduced, so that the assembly of the valve is simplified.

Alternatively, the two valve elements can be designed as separate valve elements. They can be connected to one another mechanically by way of a coupling element or directly. In particular, the two valve elements can each be designed cylindrical (that is, two cylindrical bodies which are connected to one another directly or by way of a coupling element). The cylindrical design of the two valve elements facilitates the production and movable mounting of the two valve elements in the common valve housing.

In each of the two valve elements, a through channel can be constructed such that, in the first valve position, it fluidically connects the first valve port to the third valve port and, in the second valve position, it fluidically connects the second valve port to the third valve port. The through channel of the two valve elements can also be designed such that, in a third valve position, it (completely) decouples the third valve port from the first valve port and from the second valve port. In this way, the shut-off position described above is realised.

The through channel of each (cylindrical) valve element can be formed in the interior of the respective valve element (for example, in the cylinder body if the valve element has a cylindrical design). The through channel of each valve element can have two channel openings which are arranged on the outside of the valve element (for example, on the cylindrical envelope if the valve element has a cylindrical design) at an angular spacing of substantially 90° from one another. Other angular spacings of the two channel openings are also conceivable.

In the interior of each valve element, the through channel can be arranged in an imaginary plane extending substantially perpendicularly to the rotation axis of the respective valve element. If the two valve elements are integrated into a single valve element, then the two through channels can lie in two imaginary planes extending perpendicularly to the rotation axis of each valve element, said planes having the same axial spacing from one another as the axial spacing from one another of the valve ports of the two valve units. Thus, on actuation (rotation) of the common valve element, the two through channels can be brought into coincidence (and therefore fluidically coupled) with the respective valve ports of the first and second valve unit.

Independently of the embodiment of the two valve elements described here as separate valve elements or as part of a common valve element (e.g. an integral embodiment), the through channel of each valve element can have at least two channel portions. These can be realised as bores.

The at least two channel portions of each through channel can be arranged in the imaginary plane relative to one another such that they meet one another in the interior of the respective valve element at an angle of greater than 90°. In other words, the two channel portions of each through channel are arranged at an angle of greater than 90° to one another. In addition, the at least two channel portions can each emerge toward the outside of the valve element at an oblique angle. Due to the oblique (and thus non-orthogonal) arrangement of the at least two channel portions to one another described here, overall a through channel with improved flow properties comes into existence. The reason for this is that since the individual channel portions do not form a right-angle junction in the through channel and therefore transition more gently into one another, the heating and/or cooling medium can flow through the valve with less flow resistance. Thus, the flow rate can be increased, turbulence and pressure differences in the valve can be substantially reduced and the noise generation in the valve can be significantly reduced.

The valve housing can be designed hollow cylinder-shaped or have at least a cylindrical receptacle space for movably receiving the two valve elements. The hollow cylinder-shaped valve housing or the cylindrical receptacle space can have a cylindrical inner wall which cooperates with both the valve elements such that fluid can only flow through the two through channels if they are brought into contact with the valve openings of the two valve units. An advantage of the cylindrical design of the valve elements and the valve housing described here lies therein that the valve according to the invention can be produced substantially more simply and economically than other valve designs such as, for example, a ball valve design, but nevertheless operates precisely. The two valve elements can be installed, mounted in the housing and sealed fluidically against the outside substantially more easily than comparable ball valves.

As described above, the two valve elements can be moved together by means of an actuating apparatus. For this purpose, the valve can comprise an actuating apparatus. This can be integrated into the valve housing or mounted (directly) on the valve housing. The actuating apparatus can have a motor or a stepper motor in order to move (rotate) the two valve elements continuously or step-wise. The motor or stepper motor can be mechanically coupled to the two valve elements by way of a rotary shaft arranged along a common rotation axis of the two valve elements.

The actuating apparatus is provided to move (rotate) the two valve elements back and forth between the first valve position and the second valve position. If the valve has a third valve position (e.g. a shut-off position), then the actuating apparatus can also be provided to move (rotate) the two valve elements, when needed, into the shut-off position.

The actuation of the rotary shaft and thus of the two valve elements between the valve positions described above can take place continuously or step-wise. In particular, the actuating apparatus can be provided to move (rotate) the two valve elements into any desired intermediate position between the first valve position and the second valve position in order to regulate the flow of heating and/or cooling medium. The motor or stepper motor can be coupled directly to the rotary shaft in order to enable a compact construction.

The valve can further comprise a sensor apparatus. In particular, the sensor apparatus can be mounted on and/or integrated into the valve (valve housing). The sensor apparatus can be provided to measure the temperature and/or the flow (and/or flow rate) of the fluid (heating and/or cooling medium) flowing through the valve. For this purpose, the sensor apparatus can comprise at least one temperature sensor which is provided for measuring the temperature of the fluid flowing through the valve. The at least one temperature sensor can be arranged in or close to the first valve unit.

According to a development, the sensor apparatus can comprise at least two temperature sensors, wherein a first temperature sensor is arranged in or close to the first valve unit in order to measure the temperature of the heating and/or cooling medium when it flows through the first valve unit. A second temperature sensor can be arranged in or close to the second valve unit in order to measure the temperature of the heating and/or cooling medium when it flows through the second valve unit.

Additionally or alternatively to the at least one temperature sensor, the sensor apparatus can comprise at least one flow sensor which is provided for measuring the flow of the heating and/or cooling medium flowing through the valve. The at least one flow sensor can be arranged in or close to the first valve unit and/or in or close to the second valve unit.

From the measured flow (volume flow rate) and the measured temperature difference of the fluid flowing through the valve, the heat and/or cold quantity used can be established.

According to a development, the sensor apparatus can comprise at least two flow sensors, wherein a first flow sensor can be arranged in or close to the first valve unit in order to measure the flow and/or the flow rate of the heating and/or cooling medium flowing through the first valve unit. A second flow sensor can be arranged in or close to the second valve unit in order to measure the flow and/or the flow rate of the heating and/or cooling medium flowing through the second valve unit. From a detected flow difference between the first valve unit and the second valve unit, a leak in the consumer circuit can be inferred.

The valve can further comprise a control apparatus. In particular, the control apparatus can be mounted on and/or in the valve. The control apparatus can be provided to read out and/or evaluate the sensor data (temperature measurement values and/or flow rate values) provided by the sensor apparatus. In addition, the control apparatus can be provided to trigger the actuating apparatus (with the aid of control commands generated by the control apparatus). The triggering of the actuating apparatus can take place on the basis of the captured sensor data and/or further external sensor data and control commands. In order to carry out the control and evaluation operations described here, the control unit can comprise at least one processor, at least one memory store and/or at least one communication interface.

By means of the integration, as described, of the control apparatus and the sensor apparatus in the valve, the valve becomes a smart valve that can regulate itself. It can independently regulate the flow of the fluid flowing through the valve on the basis of the measured flow rate values and temperature values. The communication paths between the sensor apparatus, the control apparatus and the actuating apparatus are short since these apparatuses are constructed on the valve and/or are integrated thereinto, so that a majority of the cabling between the individual components is also dispensed with and/or reduced. The cabling of the smart valve to the outside world can remain restricted to an electrical power feed and to a few and/or one data line(s) for communication with the outside world (for example, with external temperature sensors and/or a building control centre).

According to a further aspect of the invention, a system for heating and/or cooling is provided, wherein the system comprises: a heating circuit for providing heat; a cooling circuit for providing cold; and the valve described above for optional (fluidic) coupling of the heating circuit and the cooling circuit to a consumer. The consumer can be a heat consumer and/or a cold consumer (for example, an air-conditioning system).

The consumer can be coupled to the third valve port of the two valve units of the valve. The heating circuit can be coupled to the first or second valve port of the two valve units of the valve. The cooling circuit can be coupled to the second or the first valve port of the two valve units of the valve. By means of the coupling described herein of the heating circuit, the cooling circuit and the consumer to the valve, it is possible selectively to couple the consumer to the heating circuit and the cooling circuit. The valve can control the optional coupling of the consumer to the heating circuit or the cooling circuit independently, for example, on the basis of sensor data.

According to a further aspect of the invention, a method for measuring the heat and/or cold quantity fed to a consumer is provided. The method is carried out with the aid of the valve described above which is designed to couple the consumer optionally to a heating circuit and/or to a cooling circuit fluidically. The method comprises the following steps: measuring the temperature of the heating and/or cooling medium flowing through the first valve unit of the valve and fed to the consumer; measuring the temperature of the heating and/or cooling medium flowing through the second valve unit of the valve and conducted away from the consumer; measuring the flow rate of the heating and/or cooling medium flowing through the first valve unit, and/or measuring the flow rate of the heating and/or cooling medium flowing through the second valve unit; establishing a temperature difference between the measured temperature of the heating and/or cooling medium flowing through the first valve unit and the measured temperature of the heating and/or cooling medium flowing through the second valve unit; and from the established temperature difference and the measured flow rate, determining the heat and/or cold quantity fed to the consumer.

The measurement of the temperatures of the heating and/or cooling medium in the two valve units and the measurement of the flow rate of the heating and/or cooling medium in the first valve unit and/or in the second valve unit can take place substantially continuously or semi-continuously (at temporally fixed intervals, recurrently).

In particular, the temperature measurement values and the flow rate measurement values originating from the cooling medium can be logged separately from the temperature measurement values and flow rate measurement values originating from the heating medium in order to be able to determine separately the heat quantity and the cold quantity consumed. The logging of the sensor measurement values can take place, for example, on the basis of the valve position (first valve position, second valve position).

According to a further aspect of the invention, a method for detecting a leak in a heating and/or cooling circuit is provided. The method is carried out with the aid of the valve described above which is designed to couple a consumer optionally to the heating circuit and/or to the cooling circuit fluidically. The method comprises the following steps: measuring the flow rate of the heating and/or cooling medium flowing through a first valve unit and fed to the consumer; measuring the flow rate of the heating and/or cooling medium flowing through the second valve unit and conducted away from the consumer; and determining that a leak is present if a difference between the flow rates measured in the first valve unit and the second valve unit exceeds a predetermined threshold value.

If the predetermined threshold value is exceeded, the method can further comprise the following steps: automatic switching of the valve into a shut-off position; and/or generating and outputting a leak warning signal. The leak warning signal can be an optical, acoustic or other warning signal.

BRIEF DESCRIPTION OF THE DRAWINGS

Further advantages and aspects of the invention will now be described by way of examples making reference to the drawings. In the drawings.

DETAILED DESCRIPTION

Figure 1A:
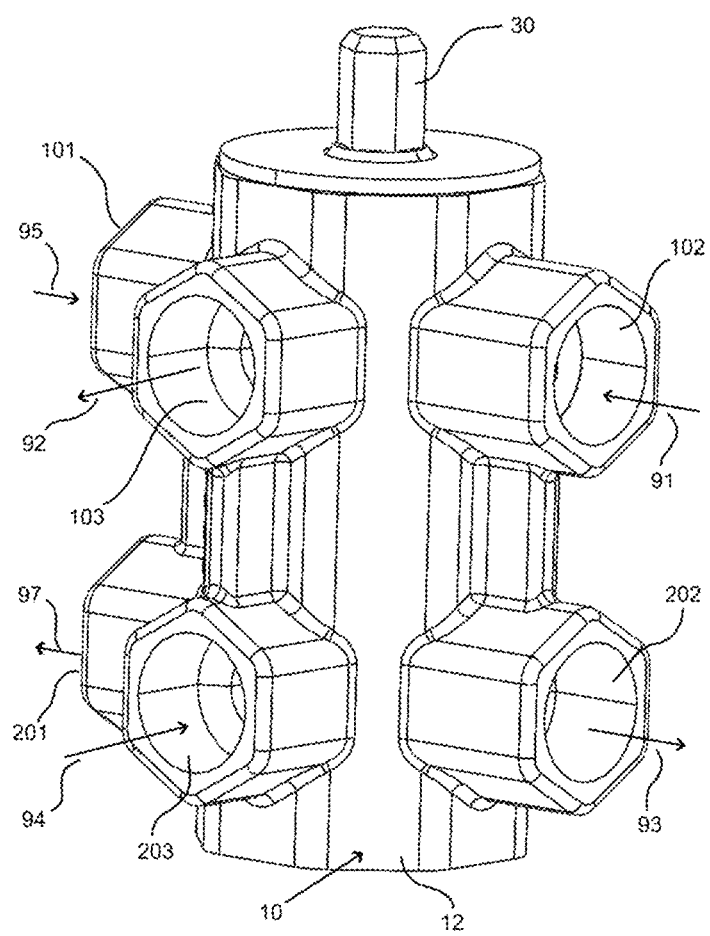
FIGS. 1a and 1b show a three-dimensional view and a sectional view of a valve according to the present invention.
Figure 1B:
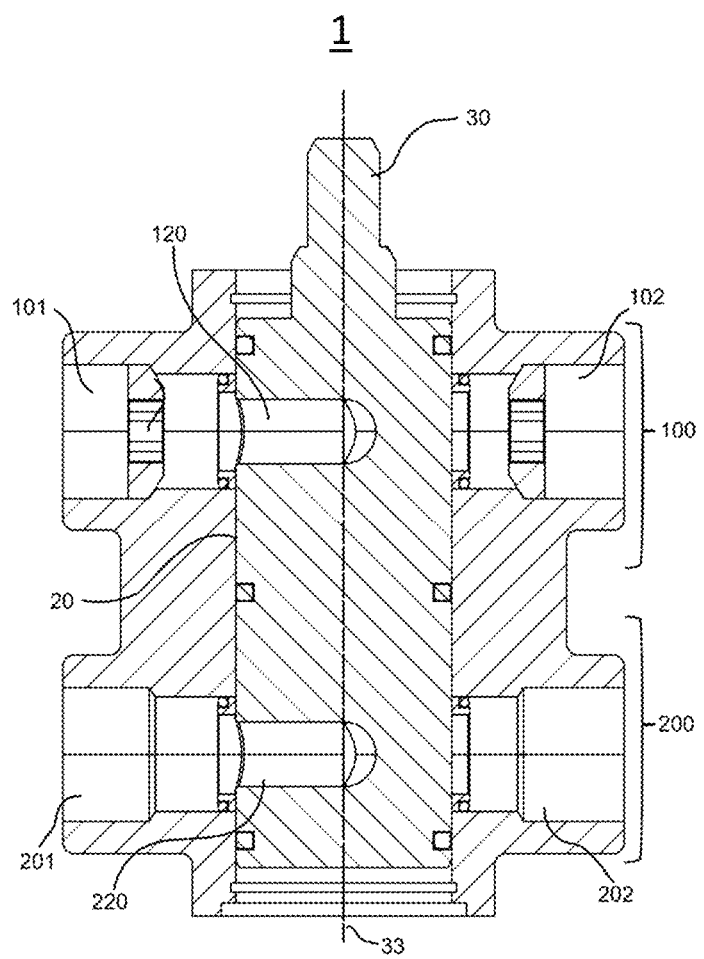

In the following, reference is made to FIGS. 1a and 1b. FIG. 1a shows a three-dimensional view of a valve 1 according to the present invention. FIG. 1b shows a sectional view of the valve 1 shown in FIG. 1a.

The valve 1 is designed for flow regulation in a heating and/or cooling system. In particular, the valve 1 can be fluidically coupled to a heating and/or cooling circuit, in order, for example, to supply a consumer (e.g. a heating and/or cooling element installed in a building) optionally with heat or cold.

The heating and cooling circuit is indicated in FIG. 1a purely by the arrows 91, 93, 95 and 97. The consumer circuit is indicated in FIG. 1a purely by the arrows 92, 94. The heating and cooling circuit can be a conventional heating and cooling circuit which is installed, for example, in a building in order to feed heat or cold to a heating and/or cooling element installed in the building. Any medium that is suitable for the transport of heat and/or cold can be used as the heating and/or cooling medium. For example, water or another fluid with a high heat capacity can be used for the transport of heat and/or cold.

The valve 1 comprises a first valve unit 100 and a second valve unit 200. The first valve unit 100 has three ports 101, 102, 103. The second valve unit 200 also has three ports 201, 202, 203 (see FIG. 1a). The valve 100 is thus a 6-way valve with three valve ports for the first valve unit 100 and three valve ports for the second valve unit 200.

The valve 1 further comprises a valve housing 10. The valve housing 10 has an interior chamber 20 (see FIG. 1b) for accommodating at least one valve element, as described in more detail below. The valve housing 10 is designed as a common valve housing for the two valve units 100, 200. In other words, the two valve units 100, 200 are integrated by means of the common valve housing 10 into a single valve. By means of this integration, a particularly compact construction of the valve 1 is enabled. Furthermore, by means of the unified housing 10, the number of the valve components is reduced, so that the assembly is simplified.

In the valve 1 shown in FIGS. 1a and 1b, the valve housing 10 is designed hollow cylinder-shaped. It should be understood that other valve housings 10 deviating from the hollow cylinder shape are also conceivable.

The ports 101, 102, 103 of the first valve unit 100 are arranged on the hollow cylindrical envelope 12 of the valve housing 10. The ports 101, 102, 103 of the first valve unit 100 are herein arranged at a predetermined first axial height on the hollow cylindrical envelope 12 and have an angular spacing from one another in the circumferential direction of (approximately) 90°. In exactly the same way, the ports 201, 202, 203 of the second valve unit 200 are arranged on the hollow cylindrical envelope 12 of the valve housing 10. The ports 201, 202, 203 of the second valve unit 200 are arranged at a predetermined second axial height on the hollow cylindrical envelope 12 and have an angular spacing from one another in the circumferential direction of (approximately) 90°. The two axial heights are selected such that the ports 101, 102, 103 of the first valve unit 100 are arranged offset relative to the ports 201, 202, 203 of the second valve unit 200 in the axial direction of the valve housing 10 by a predetermined spacing.

The valve 1 further comprises a first valve element 110 and a second valve element 210 (see FIG. 1b). The first valve element 110 is associated with the first valve unit 100. In exactly the same way, the second valve element 210 is associated with the second valve unit 200. The first valve element 110 and the second valve element 210 are each designed cylindrically. The first valve element 110 and the second valve element 210 are accommodated rotatably mounted in the cylindrical interior 20 of the valve housing 10, so that the two valve elements 110, 210 are rotatable about a common axis 33. The common axis 33 corresponds to the axis of the cylindrical interior chamber 20 and coincides with the axes of the two cylindrical valve elements 110, 210. In addition, the two valve elements 110, 210 are arranged behind one another in the axial direction of the interior chamber such that the rotatable first valve element 110 can cooperate fluidically with the ports 101, 102, 103 of the first valve element 100 and the rotatable second valve element 210 can cooperate fluidically with the ports 201, 202, 203 of the second valve unit 200, as described in greater detail below.

The two cylindrical valve elements 110, 210 can be designed as separate cylindrical elements which are mechanically connected to one another, for example, by way of a coupling element. Alternatively, it is also conceivable that the two cylindrical valve elements 110, 210 are directly connected (coupled) to one another or are part of a common, integrally designed cylindrical valve element which is rotatably mounted in the interior chamber 20. The implementation of a common valve housing 10 and a common integrally designed cylindrical valve element 110, 210 that is accommodated in the valve housing 10 enables a compact, stable and economical construction of a 6-way valve.

Each of the cylindrical valve elements 110, 210 has a through channel 120, 220 (see FIG. 1b). The through channel 120, 220 of each valve element 110, 210 is arranged in the respective valve element 110, 210 in a plane perpendicular to the axis of the respective valve element 110, 210. In addition, the through channel 120, 220 of each valve element 110, 210 has two channel openings which are arranged at an angular separation of (approximately) 90° on the envelope of the respective cylindrical valve element 110, 210 (see also FIG. 2b). Dependent upon the rotary position of the two cylindrical valve elements 110, 210 relative to the housing 10, the two channel openings of each valve element 110, 210 can be brought into coincidence with the respective first valve port 101, 201 and the respective third valve port 103, 203 of the first valve unit 100 and the second valve unit 200 (hereinafter called the first valve position). Alternatively, the two channel openings of each valve element 110, 210 can be brought into coincidence with the respective second valve port 102, 202 and the respective third valve port 103, 203 of the first valve unit 100 and the second valve unit 200 (hereinafter called the second valve position).

In the first valve position, therefore, with the aid of the through channel 120 of the first cylindrical valve element 110, the valve port 101 is fluidically coupled to the third valve port 103 of the first valve unit 100. In addition, with the aid of the through channel 220 of the second valve element 210, the first valve port 201 is fluidically coupled to the third valve port 203 of the second valve unit 200. In the second valve position, with the aid of the through channel 120 of the first valve element 110, the second valve port 102 is fluidically coupled to the third valve port 103 of the first valve unit 100 (this valve position is shown, by way of example, in FIG. 2b), and with the aid of the through channel 220 of the second valve element 210, the second valve port 202 is fluidically coupled to the third valve port 203 of the second valve unit 200. With the aid of the valve 1 described, it is therefore possible optionally to couple a consumer, which is coupled, for example, to the third valve ports 103, 203 of the two valve units 100, 200, fluidically to a heating circuit and a cooling circuit if, for example, the first ports 101, 201 are coupled to the heating circuit and the second ports 102, 202 of the two valve units 100, 200 are coupled to the cooling circuit. The valve ports 101, 102, 103 of the first valve unit 100 can herein be occupied with the supply flow (see arrows 91, 92, 95) of the cooling circuit, the heating circuit and the consumer. Accordingly, the valve ports 201, 202, 203 of the second valve unit 200 can be coupled to the return (see arrows 93, 94, 97) of the cooling circuit, the heating circuit and the consumer. An inverse occupancy in which the returns are coupled to the ports (101, 102, 103) of the first valve unit 100 and the flows are coupled to the ports (201, 202, 203) of the second valve unit 200 is also conceivable.

The switch-over from the first valve position to the second valve position and/or from the second valve position to the first valve position can easily be brought about by a common rotation of the two cylindrical valve elements 110, 210. On the basis of the arrangement of the openings of the two through channels 120, 220 in the two valve elements 110, 210 and the arrangement of the ports 101, 102, 103, 201, 202, 203 of the two valve units 100, 200, a 90° rotation in a direction (for example, clockwise) is sufficient, for example, to switch the valve 1 from the first valve position to the second valve position. In exactly the same way, the valve 1 can be switched by a 90° rotation in a contrary rotary direction (thus anticlockwise) from the second valve position to the first valve position. Also conceivable is the rotation of the two valve elements 110, 210 into a 45° intermediate position in which the ports of both valve units 100, 200 are decoupled from one another and thus an (absolute) shut-off position is reached.

Further conceivable is a gradual variation of the rotary position of the two valve elements 110, 210 in the first valve position or the second valve position in order to regulate the fluid flow through the valve 1.

For optional rotation of the two valve elements 110, 210 into the first valve position or the second valve position or into the shut-off position, the valve 1 can be provided with an actuating apparatus (not shown in FIGS. 1a and 1b). The actuating apparatus can be mounted on one of the two axial ends of the valve housing 10. The actuating apparatus and/or the motor of the actuating apparatus can be (directly) coupled to a rotary shaft 30. The mounting of the actuating apparatus at the axial end of the valve housing 10 and the coupling to the rotary shaft 30 enable a compact valve design.

The actuating apparatus can actuate (rotate) the two valve elements 110, 210 simultaneously by way of the rotary shaft 30. If needed, the actuating apparatus (and/or the motor of the actuating apparatus) can rotate the two valve elements 110, 210 into the first or second valve position or into the shut-off position and can thus couple a consumer coupled to the third ports 103, 203 optionally to the cooling circuit or the heating circuit or completely decouple it from both the circuits. The triggering of the actuating apparatus can be achieved by means of an external control apparatus. Preferably, however, the control apparatus is mounted on the valve housing 10 or is integrated in the valve housing 10 in order to realise a smart valve 1. The control apparatus is also not shown in FIGS. 1a and 1b.

Figure 2A:
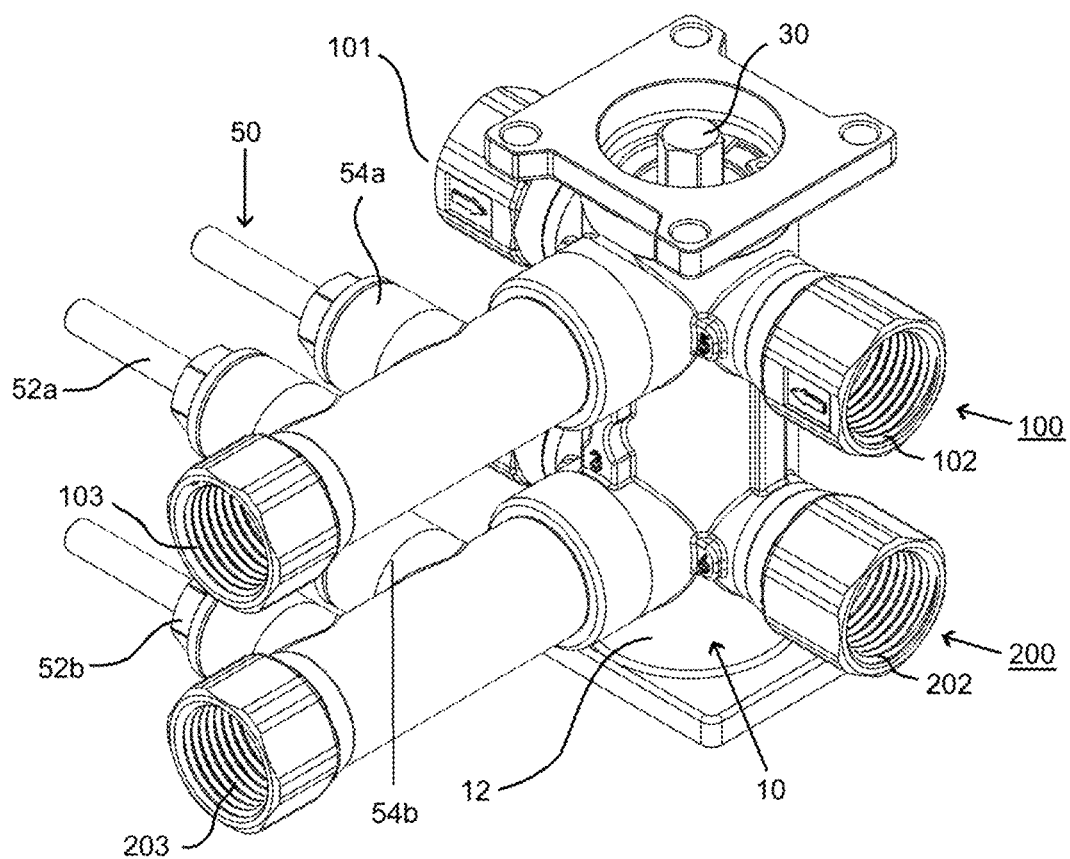
FIGS. 2a to 2c show further representations of a valve according to the invention.
Figure 2B:
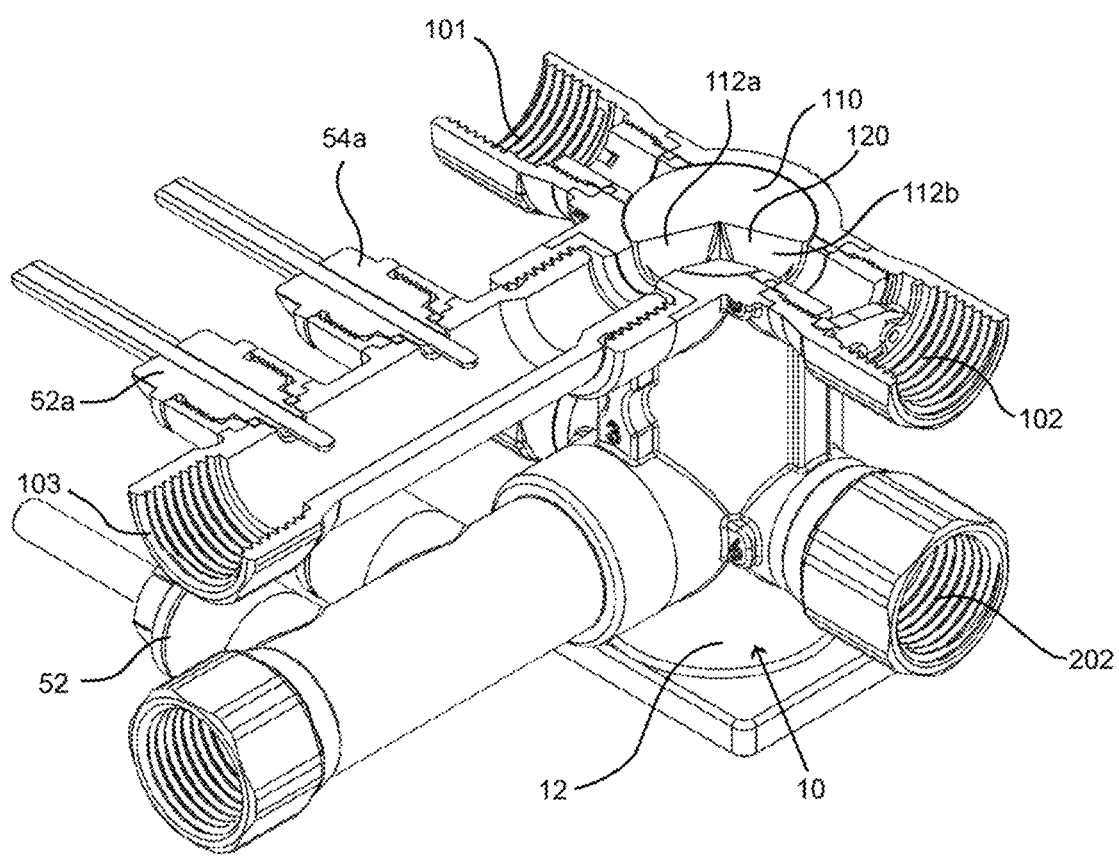
Figure 2C:
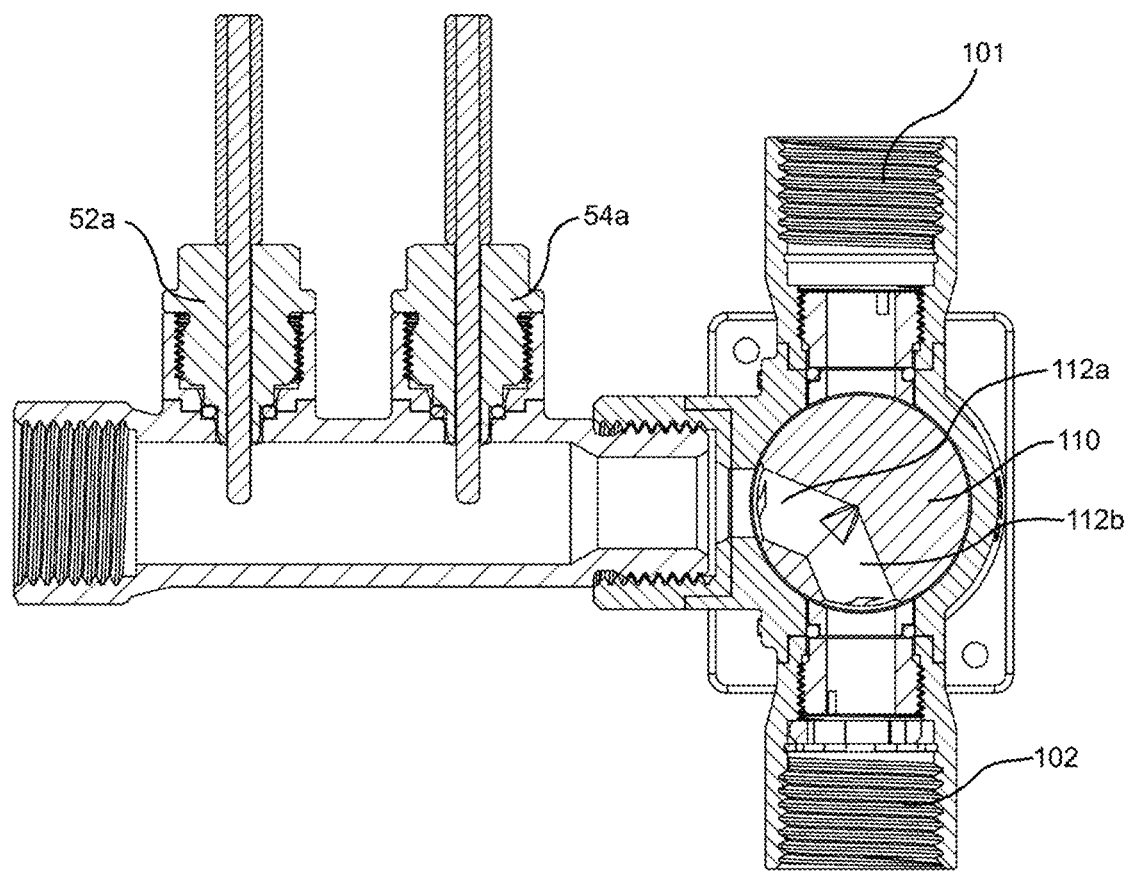

In relation to FIGS. 2a, 2b and 2c, a valve 1a is described which represents a development of the valve 1 in FIGS. 1a and 1b. FIG. 2a shows an isometric view and FIG. 2b shows a horizontal sectional view through the first valve unit 100 and FIG. 2c shows a plan view from above. In the following, valve components which are identical or similar to the valve components of the valve 1 in their structural design and function are provided with the same reference signs. For the avoidance of repetition, these components are not described again. Rather, reference is made to the above description relating to FIGS. 1a and 1b. In particular, the valve 1a has the actuating apparatus and the control apparatus described in relation to FIGS. 1a and 1b, even if these apparatuses are not shown in the drawings. The actuating apparatus is mounted on the valve housing 10 as described in relation to the valve 1 above. The control apparatus is mounted on the valve housing 10 or is integrated in the valve housing 1a. The valve 1a is again configured as a smart valve.

With the aid of FIGS. 2b and 2c, firstly the design of the through channels 110, 210 of both the valve units 100, 200 will be described. In FIGS. 2b and 2c, only the through channel 120 is shown. However, the through channel 220 (not shown in FIGS. 2b and 2c) of the second valve unit 200 has the same structural and functional features as the through channel 120 of the first valve unit 100. Each of the through channels 120, 220 is composed of two channel portions 112a, 112b. The two channel portions 112a, 112b can be realised in the form of bores into the respective valve elements 110, 210. The two channel portions 112a, 112b are arranged relative to one another in the valve element 110 such that they extend obliquely relative to the central axes of the ports 101, 102, 103 and/or 201, 202, 203 and meet at an angle of greater than 90° in the interior of the respective cylindrical valve elements 110, 210. Accordingly, the two partial channels 112a, 112b emerge at the envelope surface of the respective cylindrical valve elements 110, 210 obliquely (for example, at an angle of approximately 30° relative to the normal to the envelope surface) from each of the cylindrical valve elements 110, 210 (and not parallel to the normal to the envelope surface, as in a conventional configuration in which the two partial channels are arranged perpendicularly to one another). This arrangement of the channel portions 112a, 112b has the advantage that fluid can flow through the two valve elements 110, 210 with less flow resistance and turbulence. Thereby, the flow rate through the valve 1a can be optimised. Turbulence and pressure differences are also reduced by the channel design as described. Furthermore, the noise generation in the valve 1a is reduced.

The design, described in relation to FIGS. 2a-2c, of the two through channels 120, 220 can also be transferred to the valve 1 of FIGS. 1a and 1b.

The valve 1a of FIGS. 2a-2c differs from the valve 1 of FIG. 1a primarily in that a sensor apparatus 50 is additionally integrated into the valve 1a.

The sensor apparatus 50 comprises a first temperature sensor 52a and a first flow sensor 54a. The first temperature sensor 52a and the first flow sensor 54a are arranged on or in proximity to the third valve port 103 of the first valve unit 100 (consumer supply flow). By means of the first temperature sensor 52a and the first flow sensor 54a, it is possible to determine the temperature and the flow rate (volume flow) of the cooling and/or heating medium (preferably in real time). On the basis of the measured temperature and the flow rate of the cooling and/or heating medium, the control apparatus can re-adjust the current heating and/or cooling output if a preset value of a room temperature set at the consumer or a room thermostat or suchlike deviates from a measured actual value. The re-adjustment takes place by generating corresponding control signals for the actuating apparatus. The actuating apparatus is designed, dependent upon the captured control signal(s) to change the valve position of the two valve elements 110, 210. The change can comprise a switch-over of both the valve elements 110, 210, for example, from the first valve position into the second valve position or the third valve position and/or a gradual changing of the position of the two valve elements 110, 210 if they are in the first or second valve position. The gradual change of the position of the valve elements 110, 210 enables a (proportional) regulation of the flow of the heating and/or cooling medium. A separate hydraulic pressure equalisation is thereby made superfluous.

The sensor apparatus 50 of the valve 1a can also comprise a second temperature sensor 52b and a second flow sensor 54b. The second temperature sensor 52b and the second flow sensor 54b are arranged on or in proximity to the third valve port 203 of the second valve unit 200 (consumer return).

The temperature sensors 52a, 52b can be arranged downstream of the respective flow sensors 54a, 54b. Commercially available temperature sensors can be used as the temperature sensors 52a, 52b. Commercially available flow sensors can also be used as the flow sensors 54a, 54b. Also conceivable, however, is an indirect flow measurement. In this event, at least the flow sensor 54a in the supply flow port can be a heating element which is held at a preset temperature $T_{soll}$ which can deviate from the actual temperature $T_{ist}$ of the flowing fluid (measured by the temperature sensor 52a) by a value $\Delta T$ (so that $T_{soll}=T_{ist}+\Delta T$). The heat energy transported away from the heating element is directly proportional to the temperature difference $\Delta T$ and to the flow rate (volume flow) of the fluid in the valve 1a. By measuring the heat quantity fed in by the heating element, the flow rate (and thus the volume flow rate) of the fluid flowing through the valve 1a can thus be determined.

By comparing the flow rate values measured by the flow sensors 54a, 54b at the valve port 103 (supply flow) and at the valve port 203 (return), deviations (differences) between the flow rates measured at the valve supply flow and the valve return can be established. This comparison evaluation can be performed by the control apparatus at the valve 1a substantially in real time. If an established difference value exceeds a predetermined tolerance value (threshold value), this is an indication that the circulation between the two flow measuring points has a leak. In this case, the control apparatus can switch the valve 1a automatically into the shut-off position. Furthermore, it can generate and output a warning signal (for example, at a building control centre).

Through the comparison of the flow rate values and temperature values at the valve ports 103 and 203, with the aid of the control apparatus, the quantity of heat and/or cold delivered to the consumer can be established. The quantity of heat and/or cold used can be measured with the aid of the control apparatus over a desired time period. In particular, it is possible with the smart valve 1a described here to establish the consumption of heat and cold separately.

Making reference to the flow diagram in FIG. 3, a method for measuring the quantity of heat and/or cold fed to a consumer will now be described further. The method is carried out with the aid of the valve 1a described above which is designed to couple a consumer optionally to a heating circuit and/or to a cooling circuit fluidically. The method comprises the steps S20, S32, S34, S36 and S38, which are described in greater detail below.

The method step S30 comprises a measurement of the temperature of the heating and/or cooling medium flowing through the first valve unit 100 of the valve 1a and fed to the consumer. The method step S30 can be carried out with the aid of the sensor apparatus 50 of the valve 1a, in particular with the aid of the temperature sensor 52a arranged in the first valve unit 100.

The method step S32 comprises a measurement of the temperature of the heating and/or cooling medium flowing through the second valve unit 200 of the valve 1a and conducted away from the consumer. This method step can take place with the aid of the sensor apparatus 50 described above, in particular with the aid of the temperature sensor 52b arranged in the second valve unit 200.

The method step S34 comprises a measurement of the flow rate of the heating and/or cooling medium flowing through the first valve unit 100. Additionally or alternatively, the step S34 can also comprise a measurement of the flow rate of the heating and/or cooling medium flowing through the second valve unit 200. The measurement of the flow rate is carried out with the aid of the sensor apparatus 50 described above, in particular with one of the two flow sensors 54a, 54b or with both the flow sensors 54a, 54b.

The method step S36 comprises an establishment of a temperature difference from the two measured temperatures. Specifically, the step S36 comprises an establishment of the temperature difference from the measured temperature (temperature value) of the heating and/or cooling medium flowing through the first valve unit and from the measured temperature (temperature value) of the heating medium and/or cooling medium flowing through the second valve unit. The method step S36 can be carried out with the aid of the control apparatus described above (and/or a processor of the control apparatus described above). Alternatively, it is also conceivable that the measured temperature values and flow rate values are communicated to an external computing unit (for example, by way of a communication module built onto or integrated into the valve 1a).

The method step S38 comprises a determination of the heat and/or cold quantity fed to the consumer from the established temperature difference and the measured flow rate. This step can also be carried out with the aid of the control apparatus described above or with the aid of an external computing unit.

The steps S30, S32 and S34 described above can be carried out substantially simultaneously. In particular, the steps S30, S32 and S34 described above can be carried out substantially continuously or at predetermined temporal intervals. The measured temperature values of the fluid in the first valve unit 100 and in the second valve unit 200 and the measured flow rate values in the first valve unit and/or the second valve unit 100, 200 can be stored in an external memory store or alternatively stored (placed in intermediate storage) in a memory store provided in the control apparatus. For a person skilled in the art, it is understood that the measurement values must be digitised for storage (and further processing)

The conversion of the analogue sensor values into digital measurement data can also take place in the control apparatus or directly at the sensor (and/or sensors).

In particular, the measured temperature values and flow rate values that can be associated with the cooling medium can be stored separately from the measured temperature values and flow rates associated with the heating medium. It is therefore possible to determine and log the cold quantity and the heat quantity separately from one another, although the heating medium and the cooling medium flow through the same valve 1a.

Making reference to the flow diagram in FIG. 4, a method for detecting a leak in a heating and/or cooling circuit now be described. The method is carried out with the aid of the valve 1a described above and comprises the method steps S40, S42 and S44, which are described in greater detail below.

The method step S40 comprises a measurement of the flow rate of the heating and/or cooling medium flowing through the first valve unit 100 of the valve 1a and fed to a consumer. The measurement of the flow rate is carried out with the aid of the sensor apparatus 50 described above, in particular with the aid of the flow sensor 54a described above which is arranged in the first valve unit 100.

The step S42 comprises a measurement of the flow rate of the heating and/or cooling medium flowing through the second valve unit 200 of the valve 1a and conducted away from the consumer. This method step can also take place with the aid of the sensor apparatus 50 described above, in particular with the aid of the flow sensor 54b described above which is arranged in the second valve unit 200.

The method step S44 comprises a determination that a leak is present if a difference between the flow rates measured in the first valve unit 100 and the second valve unit 200 exceeds a predetermined threshold value (tolerance). The step S44 can be carried out with the aid of the control apparatus on the valve 1a as described above. Alternatively, it is also conceivable that the step S44 is carried out by an external computing unit.

The method steps S40 and S42 can be carried out substantially simultaneously. In particular, the method steps S40 and S42 described above can be carried out continuously or at predetermined temporal intervals. The method step S44 can be carried out immediately after the method steps S40 and S42 in order to realise the detection of leaks as far as possible in real time.

If it is determined in the method step S44 that the difference between the two flow rates in the supply flow and the return (that is, in the first valve unit 100 and in the second valve unit 200) exceeds a predetermined threshold value, the method can further comprise the step of automatically switching the valve into a shut-off position. This step is then carried out with the aid of the control apparatus implemented in the valve 1a, which outputs a corresponding actuating command for the actuating apparatus of the valve. In reaction to the received actuating command, the actuating apparatus then switches the valve 1, 1a into the shut-off position.

If it is determined in the step S44 that a leak is present in a heating and/or cooling circuit, the method can further comprise the step of generating and outputting a leak warning signal. The leak warning signal can comprise an acoustic signal, an optical signal or another signal for a building control centre.

Figure 3:
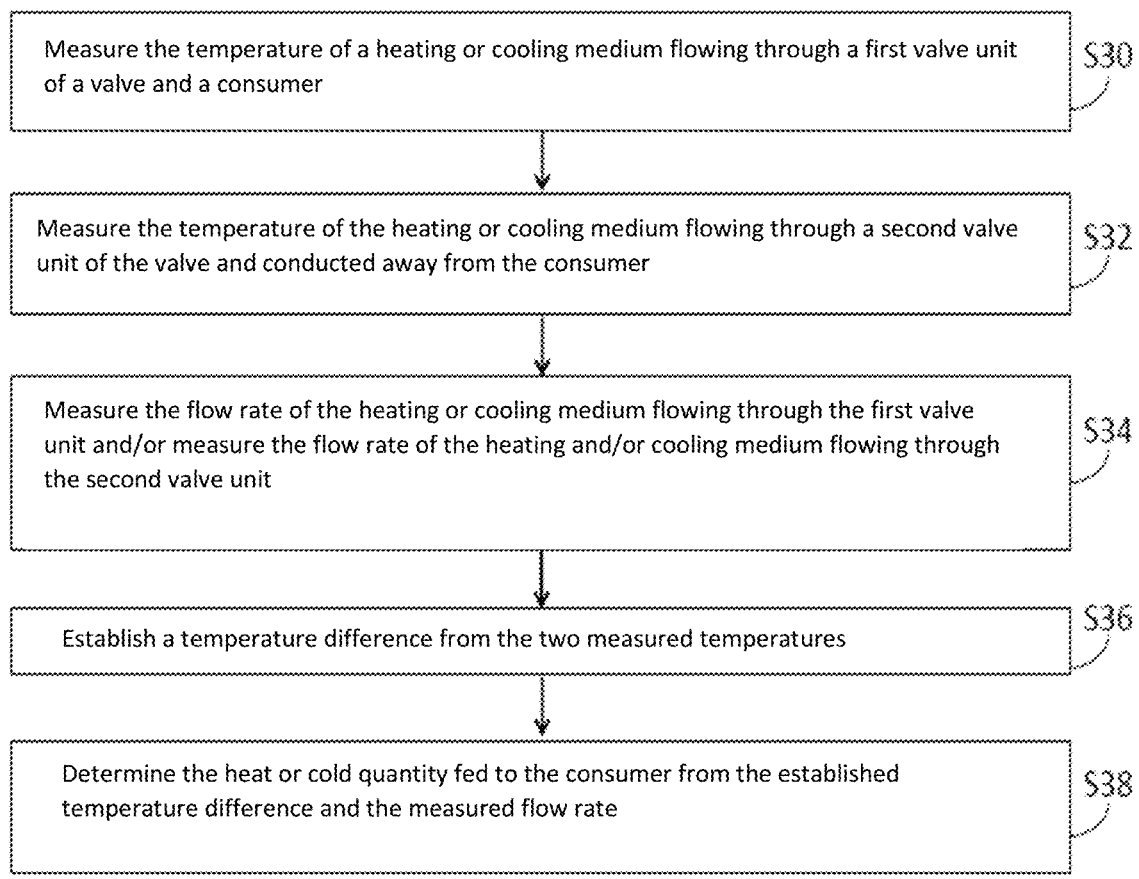
FIG. 3 shows a flow diagram illustrating a method for measuring the heat and/or cold quantity fed to a consumer, with the aid of the valves described above.
Figure 4:
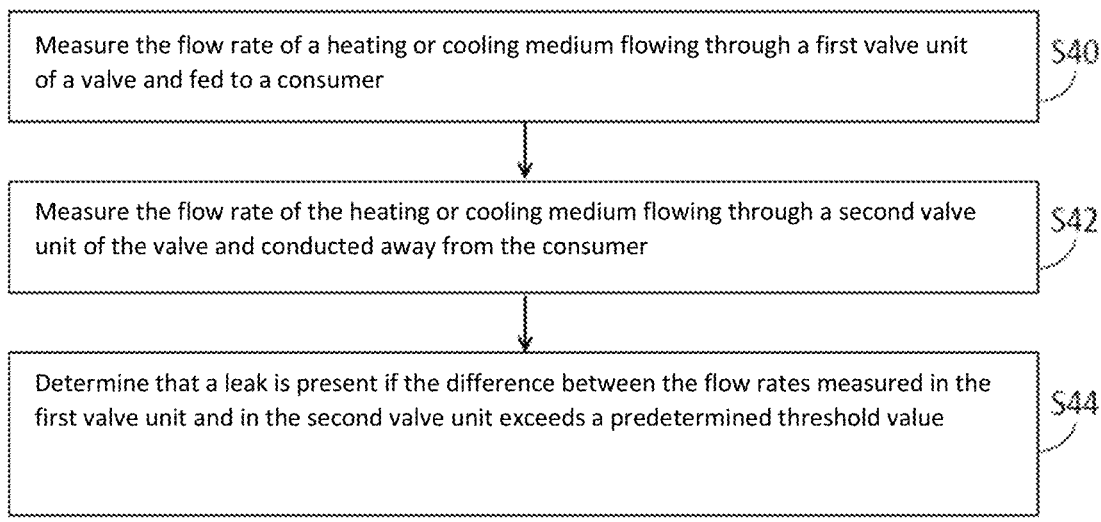
FIG. 4 shows a further flow diagram illustrating a method for detecting a leak in a heating and/or cooling circuit, with the aid of one of the valves described above.

The methods described in relation to FIGS. 3 and 4 can be carried out substantially in parallel (simultaneously) with the aid of the sensor apparatus 50 described in relation to FIGS. 2a to 2c. After all, with the temperature sensors 52a, 52b and the flow sensors 54a, 54b, the temperatures are adequately measured in the supply flow direction and the return direction and the flow rates of the fluid are adequately measured in the supply flow direction and the return direction, so that from these measurement data, both the heat quantity and/or the cold quantity as well as a possible leak in the heating and/or cooling circuit can be determined.

The valve design described here has the following advantages. Through the cylindrical design of the two valve elements, a particularly simple, economical and compact construction of a 6-way valve is possible which can be installed well in a heating and/or cooling system, even with a restricted installation space. Through the use of cylindrical valve elements, it is also possible to combine them into a single cylindrical valve element. Connecting elements for connecting the two valve elements as are necessary, for example, with spherical valve elements can be dispensed with. In addition, in contrast to a 6-way valve with spherical valve elements, the valve housing can be simply designed. Thus, for example, the valve housing can be designed for accommodating the two valve elements in the form of a cylindrical housing. In addition, through the design of the flow channels of the two valve elements described here, the flow behaviour of the fluid in the valve can be distinctly optimised.

Through the integration, as described herein, of the control apparatus, the sensor apparatus and the actuating apparatus into the valve, the valve becomes a smart valve. It can also control and/or regulate itself substantially independently on the basis of the measured sensor data. A communication of the valve with external units (for example, computing units or further sensors) can remain restricted to a minimum. In addition, the valve can be established for measuring the heat quantity and/or the cold quantity used. The heat quantity and the cold quantity used can be determined separately. In addition, the valve can be used for recognizing and preventing any leakages in the fluid circuits. The valve according to the invention thus makes a significant contribution to safety in air-conditioning technology.

The invention claimed is:

1. A valve for flow regulation in a heating and/or cooling system, comprising:
    a first valve unit comprising a first valve element; and
    a second valve unit comprising a second valve element,
    wherein the first valve unit and the second valve unit each comprise three valve ports,
    wherein the first valve element and the second valve element are arranged in a common valve housing and the first and second valve elements fluidically couple, in a first valve element position, a first valve port to a third valve port and, in a second valve element position, couple a second valve port to the third valve port;
    wherein the first valve element and the second valve element are movable together by an actuating apparatus into the first valve element position or the second valve element position;
    wherein the valve further comprises a sensor apparatus which is provided to capture the temperature and/or the flow of a heating medium or cooling medium flowing through the valve.

2. The valve according to claim 1, wherein in each of the two valve elements, a through channel is constructed which, in the first valve position, fluidically couples the first valve port to the third valve port and, in the second valve position, fluidically connects the second valve port to the third valve port.

3. The valve according to claim 1, wherein the two valve elements are part of a common valve element which is accommodated in the common valve housing able to be rotated about its rotation axis.

4. The valve according to claim 1, wherein at least one of the two valve elements is cylindrical.

5. The valve according to claim 2, wherein the through channel of each valve element is constructed in an interior of the respective valve element, and wherein the through channel of each valve element has two channel openings arranged on an outside of the valve element at an angular spacing of substantially 90° from one another.

6. The valve according to claim 2, wherein the through channel of each valve element has at least two channel portions arranged in a horizontal plane, which transition to one another in an interior of the corresponding valve element at an angle of greater than 90°.

7. The valve according to claim 1, wherein the actuating apparatus is coupled to the two valve elements and is provided to move the two valve elements together into the first valve position, the second valve position or into a shut-off position.

8. The valve according to claim 7, wherein the actuating apparatus comprises a stepper motor which is provided to move the two valve elements step-wise, dependent upon a desired flow rate.

9. The valve according to claim 1, wherein the sensor apparatus which measures the temperature and/or the flow comprises at least one temperature sensor and/or at least one flow sensor which is/are arranged in or in proximity to the first valve unit and/or in or in proximity to the second valve unit.

10. The valve according to claim 1, further comprising a control apparatus which controls the actuating apparatus actuating the two valve elements on a basis of sensor data and/or external control commands.

11. A system for heating and/or cooling, comprising:
a heating circuit configured to provide heat;
a cooling circuit configured to provide cold; and
the valve according to claim 1 for coupling of the heating circuit or the cooling circuit to a consumer.

12. The system according to claim 11, wherein the consumer is coupled to the third valve port of the two valve units, wherein the heating circuit and the cooling circuit are coupled to the first valve port and to the second valve port of the two valve units.

13. The system according to claim 11, wherein the valve is actuated on a basis of sensor data and/or external control data such that the valve couples or decouples the consumer to/from the heating circuit or the cooling circuit.

14. A method for measuring the heat quantity cold quantity supplied to a consumer, wherein the method is carried out with aid of the valve according to claim 1, said valve being configured to couple the consumer to a heating circuit or a cooling circuit-, wherein the method comprises:
measuring the temperature of the heating medium cooling medium flowing through the first valve unit of the valve and fed to the consumer;
measuring the temperature of the heating medium cooling medium flowing through the second valve unit of the valve and conducted away from the consumer;
measuring the flow rate of the heating medium or cooling medium flowing through the first valve unit and/or measuring the flow rate of the heating medium or cooling medium flowing through the second valve unit;
establishing a temperature difference from the measured temperature of the heating medium or cooling medium flowing through the first valve unit and from the measured temperature of the heating medium or cooling medium flowing through the second valve unit; and
determining a heat quantity or a cold quantity fed to the consumer from the established temperature difference and the measured flow rate.

15. The method according to claim 14, wherein the measuring of the temperatures of the heating medium or cooling medium in the two valve units and the measurement of the flow rate of the heating medium or cooling medium in the first valve unit or in the second valve unit takes place substantially continuously.

16. The method according to claim 14, wherein temperature measurement values and flow rate measurement values originating from the heating medium are logged separately from temperature measuring values and the flow rate measurement values originating from the cooling medium in order to be able to determine the heat quantity and the cold quantity consumed, separately from one another.

17. A method for detecting a leak in a heating or cooling circuit, wherein the method is carried out with the aid of the valve according to claim 1, said valve being configured to couple a consumer fluidically to the heating circuit or the cooling circuit, wherein the method comprises:
measuring a flow rate of the heating medium or cooling medium flowing through the first valve unit and fed to the consumer;
measuring the flow rate of the heating medium or cooling medium flowing through the second valve unit and conducted away from the consumer; and
determining that a leak is present if a difference between the flow rates measured in the first valve unit and the second valve unit exceeds a predetermined threshold value.

18. The method according to claim 17, wherein, if the predetermined threshold value is exceeded, the method further comprises:
automatic switching of the valve into a shut-off position; and/or
generating and outputting a leak warning signal.

* * * * *